J. Stratton.
Carburetting Air.

N° 76114. Patented Mar. 31, 1868.

Witnesses.
J. C. Theake
Chas Clippeman

Inventor.
James Stratton

United States Patent Office.

JAMES STRATTON, OF PHILADELPHIA, PENNSYLVANIA.

Letters Patent No. 76,114, dated March 31, 1868.

IMPROVED APPARATUS FOR CARBURETTING AIR.

The Schedule referred to in these Letters Patent and making part of the same.

TO ALL WHOM IT MAY CONCERN:

Be it known that I, JAMES STRATTON, of Philadelphia, in the county of Philadelphia, and State of Pennsylvania, have invented a new and useful Improvement in Gas-Generators; and I do hereby declare that the following is a full, clear, and exact description thereof, reference being had to the annexed drawings.

The nature of my invention consists in so forming the gas-generator as that a continuous current of atmospheric air will be forced through it, and all of said air be brought in contact with the gasoline with which the generator is charged, so that it may be be impregnated with the inflammable matter contained in the same.

Figure 1:
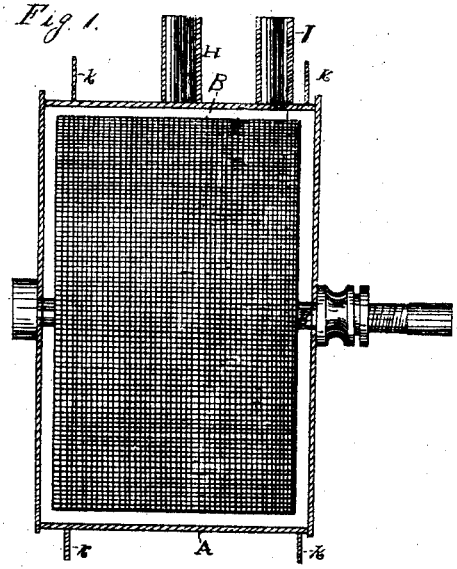
Figure 2:
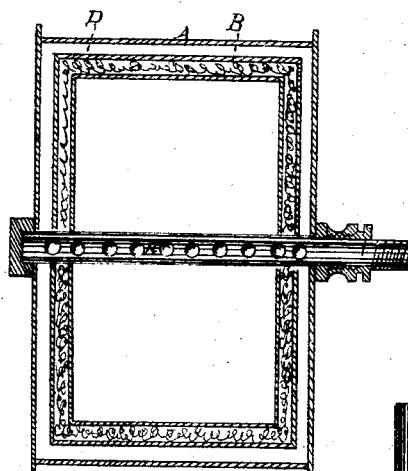
Figure 3:
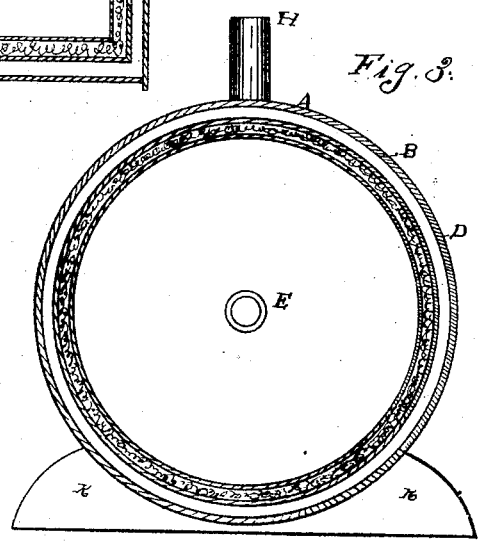
Figure 4:
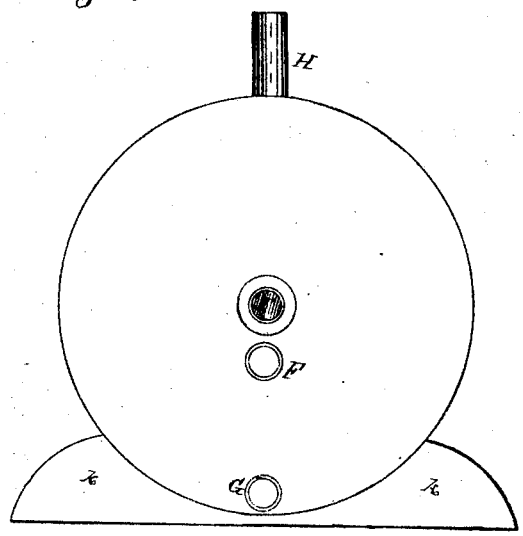

To enable others skilled in the art to which it appertains to make and use my machine, I describe it as follows:

I construct, of any desired size, a cylindrical tank, A, figs. 1, 2, 3, and 4, which I place on a stand or base for its support, as seen at K, figs. 1, 3, and 4. In the centre of this tank I place a perforated pipe or hollow shaft, E, figs. 1, 2, 3, 4, and where it passes through the head or end of said tank, it is secured from leakage by means of a stuffing-box made in the usual way, so as to allow the said shaft to revolve freely in the tank without leaking.

Upon this shaft E, and inside of said tank, I place a perforated cylinder, D, figs. 2, 3, which may be from three (3) to four (4) inches less in diameter than the tank, thus allowing a space around it, and between it and the tank, of one and one-half ($1\frac{1}{2}$) or two (2) inches, and outside of this cylinder D, I place another cylinder, B, which is also perforated, allowing a space between them of about from one-quarter ($\frac{1}{4}$) to one-half ($\frac{1}{2}$) an inch. This space I fill with cotton-batting. The perforations or holes in these cylinders are small, say about one-eighth ($\frac{1}{8}$) or one-quarter ($\frac{1}{4}$) of an inch in diameter, and very numerous, so as to be in close proximity over their whole surfaces.

On this shaft E, just outside of the before-named stuffing-box, is placed a pulley or wheel, by means of which it is put in motion, and outside of this pulley or wheel is attached to the end of the shaft E an air-pipe, in such a manner as to allow the shaft E to revolve without turning the said air-pipe. This air-pipe is attached at its opposite end to a fan or blower, which may be made in any desired form, and of any size required, and driven in any suitable manner.

In one end of the tank A, and near the lower side, I place a pipe, G, fig. 4, through which the contents of the tank can be drawn off at pleasure, and near to the centre of the same end of the tank I place the pipe F, by means of which I can know when the proper amount of gasoline is in the tank. On the top of the tank, and at its centre, I place the pipe H. This pipe is attached to the gas-pipe leading to the burners. Near one end of the tank I place the pipe I, through which the tank is charged with gasoline.

It will be seen from the foregoing description that if the tank A is charged with gasoline until it rises to the pipe F, which is near its centre, the cylinders B and D will be partly submerged in the gasoline, and if they revolve, the intervening cotton-batting will be saturated therewith continuously, and if the fan is put in motion, a current of air will be forced through the air pipe which leads from the fan to the perforated pipe E, and through it into the inner perforated cylinder D, through its perforations and the cotton-batting, where it will be impregnated with the inflammable matter of the gasoline with which the cotton is constantly saturated. It will then pass through the perforations of the outer cylinder B into the space between it and the tank A, thence through the pipe H into the gas-pipe leading to the burners, and as long as the tank is kept properly charged with the gasoline, and the fan and cylinder kept in proper motion, a gas will be generated that when ignited will produce a brilliant light.

Having thus fully described my invention, what I claim, and desire to secure by Letters Patent, is—

1. The combination of the tank A, cylinders B and D, and the intervening cotton-batting C, substantially as and for the purpose set forth and described.

2. The perforated pipe or hollow shaft E, in combination with the cylinders B and D, substantially as shown and described, and for the purpose specified.

JAMES STRATTON.

Witnesses:
EDW. H. WILLIAMSON,
P. WILLIAMSON.